United States Patent
Miyoshi et al.

(10) Patent No.: US 6,931,266 B2
(45) Date of Patent: Aug. 16, 2005

(54) CELLULAR PHONE IN WHICH MEMORY IS REMOVABLY INSTALLABLE DUE TO THE REMOVABILITY OF BATTERY, AND BATTERY RECHARGER CAPABLE OF SUPPORTING DATE WRITE TO CELLULAR PHONE MEMORY

(75) Inventors: Hideki Miyoshi, Yokohama (JP); Shozo Miyagawa, Yokohama (JP); Noboru Kagemoto, Yokohama (JP)

(73) Assignee: Rohm Co., Ltd., Kyoto (JP)

( * ) Notice: Subject to any disclaimer, the term of this patent is extended or adjusted under 35 U.S.C. 154(b) by 641 days.

(21) Appl. No.: 09/811,776

(22) Filed: Mar. 20, 2001

(65) Prior Publication Data

US 2001/0044331 A1 Nov. 22, 2001

(30) Foreign Application Priority Data

Mar. 29, 2000 (JP) ........................................ 2000-091302

(51) Int. Cl.⁷ ................................................ H04B 1/00
(52) U.S. Cl. .................................... 455/572; 455/343.1
(58) Field of Search .......................... 455/556.1, 556.2, 455/557, 558, 572, 343.1, 343.5, 573, 343.6; 379/433.08

(56) References Cited

U.S. PATENT DOCUMENTS

| | | | | |
|---|---|---|---|---|
| 5,490,202 A | * | 2/1996 | Maekawa | ..................... 455/558 |
| 5,535,274 A | * | 7/1996 | Braitberg et al. | ............ 379/446 |
| 5,832,391 A | * | 11/1998 | Komoda et al. | ............. 455/572 |
| 5,864,766 A | * | 1/1999 | Chiang | ......................... 455/572 |
| 6,229,990 B1 | * | 5/2001 | Toshida | ......................... 455/69 |
| 6,244,894 B1 | * | 6/2001 | Miyashita | .................... 439/500 |

FOREIGN PATENT DOCUMENTS

| | | |
|---|---|---|
| JP | 11-187095 | 7/1999 |
| JP | 2000-32169 | 1/2000 |

* cited by examiner

Primary Examiner—Nick Corsaro
(74) Attorney, Agent, or Firm—Morgan, Lewis & Bockius LLP (57) ABSTRACT

A cellular phone in which a data storage means can be installed while meeting the requirements for a compact and lightweight design, imposed on the cellular phone, different types of batteries are selectively used on the basis that a battery used in the cellular phone is removable. That is, when a data storage means is to be additionally provided in the cellular phone, a battery having such a specially designed structure that can be installed together with a data storage memory in the cellular phone, is used with the cellular phone. When the cellular phone should preferentially be compact and lightweight, a standard battery conforming to the compact design requirement is used with the cellular phone.

2 Claims, 6 Drawing Sheets

CELLULAR PHONE IN WHICH MEMORY IS REMOVABLY INSTALLABLE DUE TO THE REMOVABILITY OF BATTERY, AND BATTERY RECHARGER CAPABLE OF SUPPORTING DATE WRITE TO CELLULAR PHONE MEMORY

CROSS REFERENCE TO RELATED APPLICATION

This application claims the benefit of Japanese application No. 2000-91302, filed Mar. 29, 2000, which is hereby incorporated by reference.

BACKGROUND OF THE INVENTION

The present invention relates to a cellular phone and battery recharger for use with the cellular phone, and more particularly to a cellular phone in which a memory can be installed freely removably and a battery recharger for charging a rechargeable battery used with the cellular phone and also capable of supporting data write to the memory of the cellular phone.

It should be noted that the cellular phone referred to herein includes, in addition to an analog or digital cellular phone, a personal handyphone system (PHS), a cordless handset used for wireless communication with a stationary telephone set, and the like.

Recent cellular phones include phones with a removable battery pack (Japanese Unexamined Patent Publication No. 11-187095), phones in which a memory card is used for the registration of phone numbers (Japanese Patent Publication 2000-32169), phones adapted to rewrite an incoming call, phones adapted to provide three chords, phones adapted to provide a variety of voice tones, etc.

SUMMARY OF THE INVENTION

A cellular phone having a music player or the like installed integrally therein is also possible as an extension of the above cellular phones. However, the addition of a function such as the music player or the like to the functions already installed in the cellular phone, creates a cellular phone with larger dimensions and weight. Furthermore, for a data recording medium having to be added for the music player opposes the requirement for a compact and lightweight design of the cellular phone. Namely, it is a technical problem how an additional data storage means such as recording medium should be installed in a cellular phone while meeting the requirement for the compact and lightweight design of the cellular phone.

Accordingly, the invention overcomes the above-mentioned drawbacks of the prior art by providing a compact and lightweight cellular phone adapted for installation of a data recording medium. Furthermore, the invention provides a battery recharger suitable for use with such a cellular phone.

The cellular phone of the invention includes a phone body in which a memory is removably installed where the battery is removably installed. Therefore, if it is desired to additionally provide a data storage function to the cellular phone, a data storage memory and a battery specially designed to install the memory to the cellular phone should be used with the cellular phone. When the cellular phone needs to be compact and lightweight, a standard-type battery meeting the requirement for the compact design should be used in the cellular phone. By using the battery, it is possible to meet the requirements for a compact and lightweight cellular phone while installing data storage means in the cellular phone.

Also, to provide a compact and lightweight cellular phone having a playback unit such as a music player installed integrally therein, a means for reading data from the memory and providing a reproduced sound should additionally be provided in the cellular phone. In this case, with music data or the like held in the memory, the data is read from the memory and a sound corresponding to the data is reproduced and outputted. Thus, the cellular phone will function as a player when the memory is installed.

Further, the battery recharger according to the present invention has a receiving unit on or from which the cellular phone having a battery to be charged is set or removed. The receiving unit is designed such that any of the above-mentioned cellular phones according to the present invention can be freely set or removed on or from the receiving seat while having the battery installed in place. Also, the battery recharger is provided with a data transmission connector enabling a connection to an external unit. This battery recharger permits to enter data from an external unit via the data transmission connector, and transfer the data to the cellular phone with the battery being charged for writing to the memory. Since the data transmission connector for connection to the external unit has to be one conforming to the general standards, the design is much limited against the compactness. However, since the data communication means for use between the cellular phone and battery recharger may be arbitrarily selected, the cellular phone can be designed more compact. Using the battery recharger provided with a transmission connector, that is a standard-compliant product to support data transfer, such as music data, etc., data can be sent from a general-purpose external unit to the cellular phone and written to the memory installed in the cellular phone. Thus making it unnecessary to use any standard-compliant product that is not suitable for the compact design of the cellular phone. Thereby, the cellular phone will also function as a recorder/player when it is set on the battery recharger while keeping the memory installed in place therein. Also, since the cellular phone can thus record data while its battery is being charged, so the user may not have to be worry about the current potential level of the battery. Thus, the present invention meets the requirement for the compact and lightweight design by providing a battery recharger suitable for use with the cellular phone and in which the data storage can be installed.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1A to 1F, 2 and 3 show the cellular phone and battery recharger according to a first embodiment of the present invention.

FIGS. 5A and 5B show the cellular phone and battery recharger according to a second embodiment of the present invention, in which

FIGS. 6A to 6D show the cellular phone and battery recharger according to a third embodiment of the present invention, in which

FIGS. 7A to 7D show the cellular phone and battery recharger according to a fourth embodiment of the present invention in which

DETAILED DESCRIPTION OF THE PREFERRED EMBODIMENT

Figure 2:
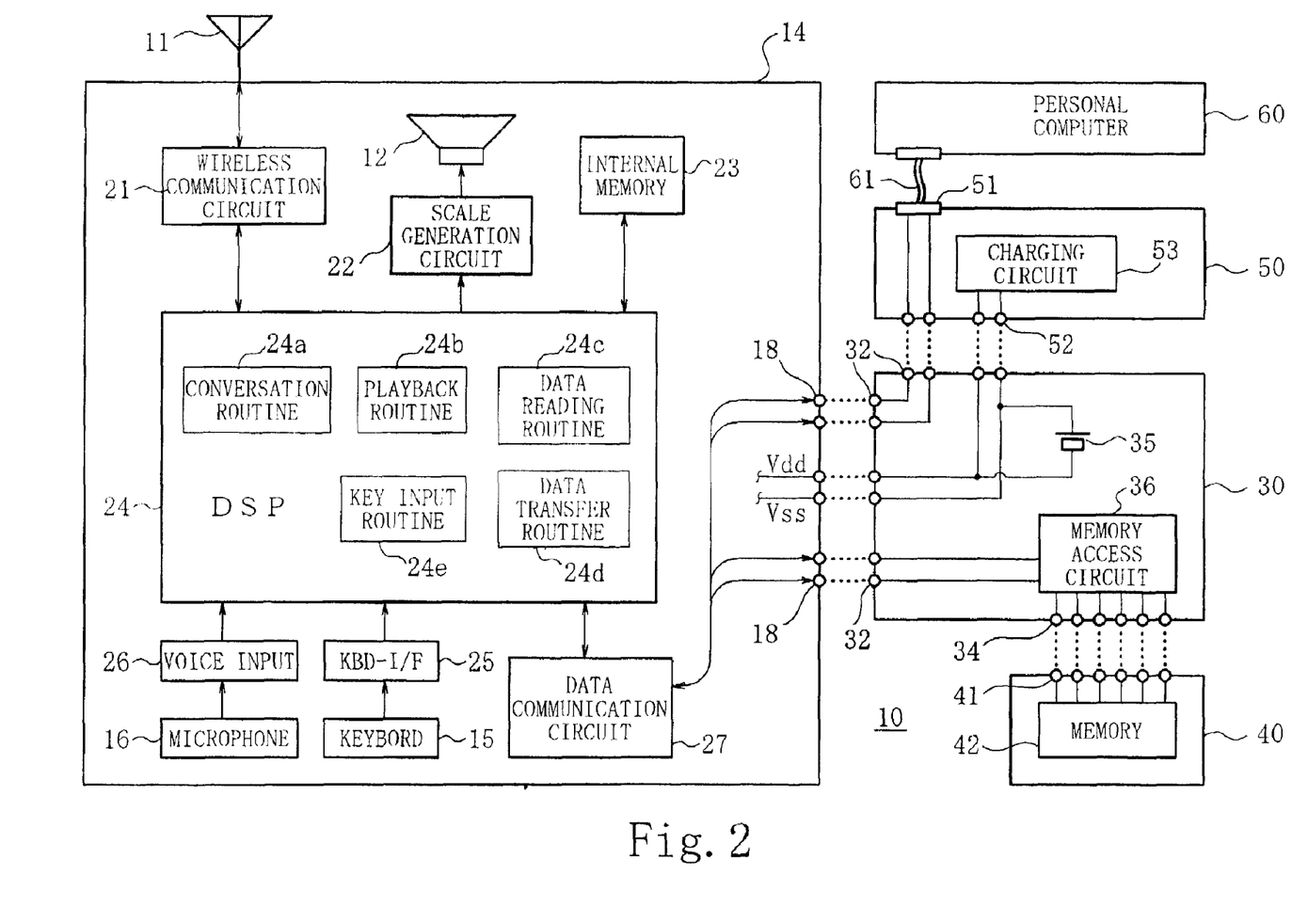
FIG. 2 is a block diagram of the cellular phone, special battery unit, recharger, memory card, and a personal computer.
Figure 3:
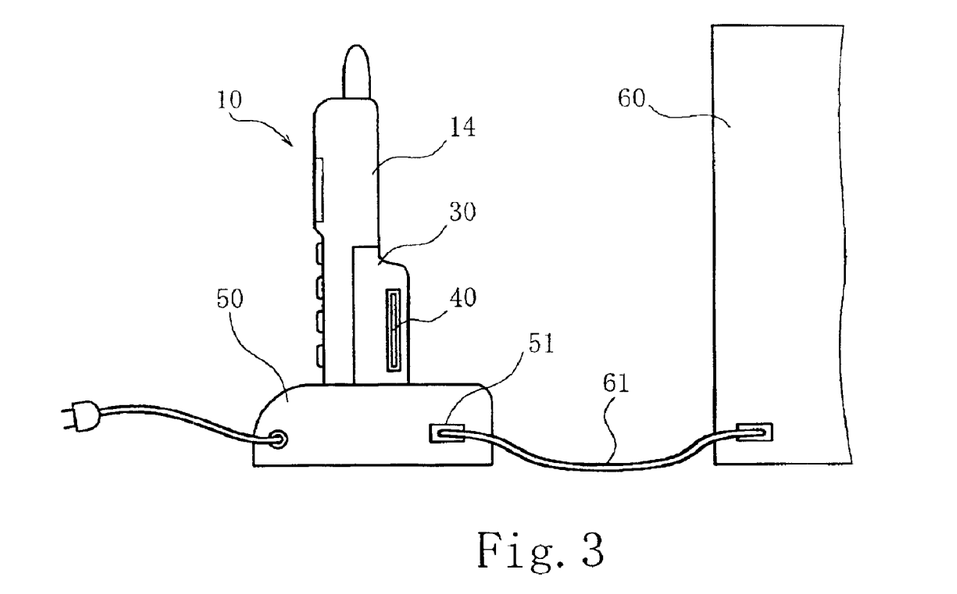
FIG. 3 is a right side elevation of the cellular phone set in the battery recharger.

The embodiments of the invention will be explained with reference to the accompanying drawings.
First Embodiment As shown in FIG. 1D, and FIGS. 2 and 3, the cellular phone 10, includes a phone body 14 capable of wireless communications (see FIGS. 1A and 1B), and a battery pack 30 installable in the phone body 14 (special battery unit, removable) (see FIGS. 1D and 1E). A battery pack 3 (standard battery, removable) is also installable in place of the battery pack 30 in the phone body 14 as shown in FIG. 1C.

Figure 1A:
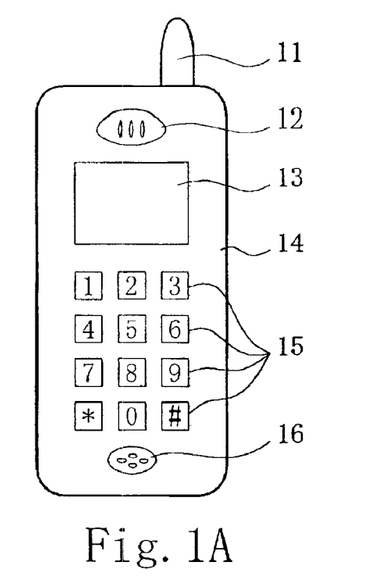
FIG. 1A is a front view of the body of the cellular phone.
Figure 1B:
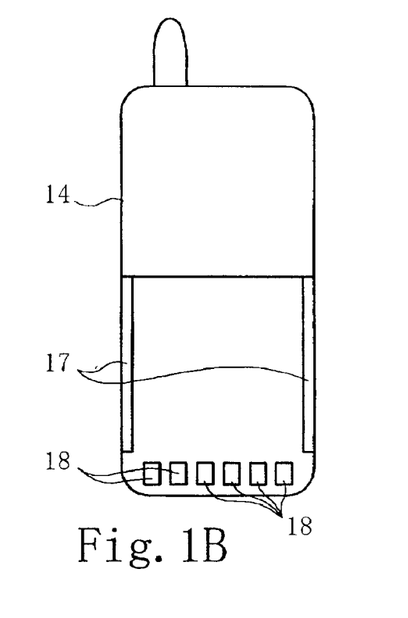
FIG. 1B is a rear view of the cellular phone body.
Figure 1C:
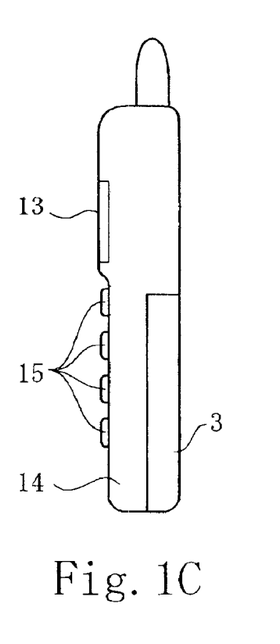
FIG. 1C is a right side elevation of the cellular phone having a standard-type battery unit installed thereto.
Figures 1D, 1E, 1F:
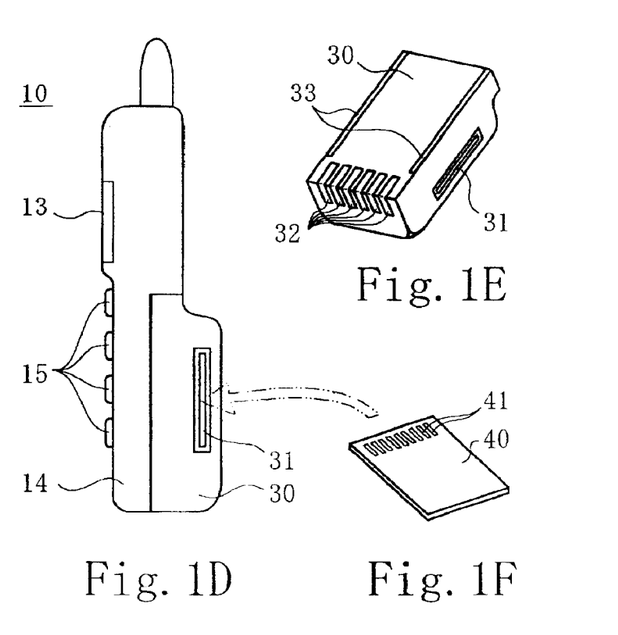
FIG. 1D is a right side elevation of the cellular phone having a special battery unit installed thereto.
FIG. 1E is a perspective view of the special battery unit.
FIG. 1F is a perspective view of a memory card.

As shown in FIG. 1A, the phone body 14 has an antenna 11 (wireless communication means) placed at the top thereof, speaker 12 (sound output means), LCD 13 (liquid crystal display or display means), keyboard 15 (operating means), a microphone 16 (voice input means), etc. provided on the front side thereof for easy speaking and dialing. In addition, the phone body 14 has an earphone connector etc. provided appropriately on the lateral side or bottom side thereof (not shown). Further, the phone body 14 has formed on the rear side thereof (see FIG. 1B) a stepped battery fixing area in which the battery pack 3 (30) is to be installed. As shown, the battery fixing area occupies substantially half of the rear side of the phone body, and has provided thereon engagement guides 17 (two, right and left in the illustrated example), and contact terminals 18 (current-carrying portion and data transmission means) (six as in the illustrated example).

The battery pack 3 (30) houses a rechargeable battery body 35 such as a nickel-cadmium battery, lithium ion battery or the like as shown in FIG. 2. The battery pack 3 (30) further provides abutments 33 (two, right and left) on the rear side thereof (at which the battery pack is to be fixed to the phone body 14) corresponding to engagement guides 17, and contact terminals 32 as shown in FIG. 1E. For easy attachment and detachment from phone body 14, abutments 33 are formed so that battery pack 3 (30) can be aligned at the upper end thereof with the lower end of the phone body 14, and slid with abutments 33 until battery pack 3 (30) does not go any more and battery pack 3 (30) is locked lightly at the inner end of the stroke. The contact terminals 32 are disposed correspondingly to the contact terminals 18 to provide an electrical connection with the latter when the battery pack 3 (30) is securely fixed to the phone body 14. Either contact terminals 32 or 18 or both are adapted to serve as spring. Also, contact terminals 32 are turned at a right angle at the bottom end of the battery pack 3 (30) and extend to the bottom end face of the battery pack 3 (30), perpendicular to the fixing surface of the battery pack 3 (30). This assures an electrical connection with contact terminals 52 of a battery recharger 50, which will be described later.

Note that contact terminals 32 of the battery pack 3 have two contact terminals 18a connected to power lines Vdd and Vss, respectively, inside the phone body 14. On the other hand, the contact terminals 32 of the battery pack 30 are identical in number to the contact terminals 18 (six as shown in FIG. 1E). Also, different from the battery pack 3, the battery pack 30 has a memory card slot 31 (memory reception means) formed therein and in which a memory card 40 can removably be inserted (see FIGS. 1D and 1E), and a memory access circuit 36 built therein (see FIG. 2).

As shown in FIG. 1F and FIG. 2, the memory card 40 encases a memory 42 such as a nonvolatile and higher integrated flash memory. When the memory card 40 is inserted into the memory card slot 31, contact terminals 41 will be electrically connected with contact terminals 34 provided in the memory card slot 31 as shown in FIG. 2.

As shown in FIG. 2, inside the batter pack 30, the contact terminals 34 are connected to the memory access circuit 36. The memory access circuit 36 is connected to some of the contact terminals 32 (two in the illustrated example), and also includes a serial-parallel converter. Thus, memory access circuit 36 accesses memory 42 via a large number of contact terminals 34 and 41 to write or read data to or from the memory while making a serial data communication with the phone body 14 via a small number of contact terminals 32 and 18.

As shown in FIG. 2, the battery recharger 50 has a charging circuit 53 including a rectification circuit, step-down circuit, etc. to produce a predetermined charging voltage from a commercial power. The charging circuit 53 has an output line to which the contact terminals 52 (two in the illustrated example) are connected. When the cellular phone 10 is set in the battery recharger 50, the contact terminals 52 will be electrically connected to the contact terminals 18 of the phone body 14 and power lines Vdd and Vss via corresponding contact terminals 32 of the battery pack 30. This is the same as with the common battery rechargers. As shown in FIG. 3, however, battery recharger 50 according to the present invention has formed thereon a wide receiving area that even the cellular phone 10 having battery pack 30 installed thereon which is larger than battery pack 3 can be set and removed just by lifting it up.

As shown in FIG. 3, battery recharger 50 further has provided on the outer surface thereof a modular jack 51 (data transmission connector) compliant to the general-purpose serial data communications standards such as USB or IEEE 1394. The modular jack 51 has terminals (see FIG. 2) which are internally connected to additional contact terminals 52 provided separately from the contact terminals 52 for the charging circuit 53. When the cellular phone 10 is set in the battery charger 50, the additional contact terminals 52 (two in the illustrated example) will also have an electrical connection to the contact terminals 18 of the phone body 14 via terminals 32 of the battery pack 30.

As shown in FIG. 2, there is provided inside the phone body 14 a wireless communication circuit 21 provided with a modem or the like to transmit or receive data wirelessly to or from a base station via the antenna 11. A keyboard interface (KBD-I/F) 25 to enter control information to the keyboard 15, and a voice input circuit 26 provided with an A/D converter or the like to capture a voice from a talker or user by means of the microphone 16 are also provided. When the cellular phone 14 is set in the battery recharger 50, these circuits and those which will be described below will be supplied with an operating power from the battery body 35 via power lines Vdd and Vss.

Also, as shown in FIG. 2, the phone body 14 incorporates a digital signal processor (DSP) 24 to control and drive the above circuits appropriately and effect various operations and sequences such as necessary communication procedure and calling in order to support conversation between the phone subscribers or users. The digital signal processor 24 has installed therein a conversation routine 24a (conversation means) to execute operations for a conversation, and a key input routine 24e to support input made by operation of the keyboard 15. Further, phone body 14 incorporates an internal memory 23 such as a flash memory or RAM, accessible for data write or read from the DSP 24, and which holds its own phone number, some phone numbers of automatically dialed destinations and provisionally store data necessary for each operation and control. The internal memory 23 is smaller in both size and capacity than the aforementioned memory 42.

Moreover, as shown in FIG. 2, the phone body 14 has provided therein a data communication circuit 27 making a serial data communications with memory access circuit 36 via contact terminals 18. Communication circuit 27 permits writing or reading data to or from the memory 42 such as music data, reproduce it and deliver the reproduce the sound out of speaker 12. Additionally, a data reading routine 24c is installed in the DSP 24 to control the data communication circuit 27 to read music data sequentially from the memory 42. A playback routine 24b is also installed in the DSP 24 to expand or decode music data passed from the data reading routine 24c at a proper time according to predetermined data compression and expansion standards such as MP3 of the MPEG standard, thereby reproducing digital data. Also a scale generation circuit 22 provided with a synthesizer circuit etc. and a demodulation circuit etc. for pulse code modulation (PCM) signals to convert digital data consecutively passed from the playback routine 24b to an analog sound signal and drive the speaker 12 with the analog sound signal.

Furthermore, as shown in FIG. 2, phone body 14 has a data transfer routine 24d installed in the DSP 24, and the data communication circuit 27 is adapted to support a serial data communication via modular jack 51 through contact terminals 18 other than for memory access and corresponding contact terminals 32 and 52 as well. With the program processing according to the data transfer routine 24d, compressed music data can be downloaded from an external unit connected to the modular jack 51, such as a personal computer 60 and transferred to the memory 42 to rewrite or add data in the memory card 40.

The cellular phone 10 and battery recharger 50 according to the first embodiment of the present invention are to be used and function as will be described below. The cellular phone can be used for conversation (normal mode) alone, for both conversation and audio playing, and also for audio recording.

These modes of operation for such functions will be described in that order.

First, for the purpose of conversation, the cellular phone 10 is to be used with the battery pack 3 installed to the phone body 14 as shown in FIG. 1C. When used in this mode of operation, the cellular phone 10 can be most compact and lightweight, and thus has an outstanding portability. The user of the cellular phone 10 operates keyboard 15 and others appropriately to have a conversation with a person at the other end by making a call, responding to a call, talking to the microphone 16 or the like, and listening to a sound from the speaker 12. The operation and conversation are supported by keyboard 15, keyboard interface KBD-I/F 25, key input routine 24e, microphone 16, voice input circuit 26, speech communication routine 24a, wireless communication circuit 21, antenna 11. The necessary power for the operation and conversation is supplied from the battery pack 3. Battery pack 3 houses battery body 35, but not memory access circuit 36. In this case, data communication circuit 27 and the routines 24b, 24c and 24d of the DSP 24 will not work in the phone body 14.

Next, for the audio player to function of the cellular phone 10, battery pack 30 is to be installed to the phone body 14 and memory card 40 having memory 42 is to be inserted in the memory card slot 31, as shown in FIG. 1D. Memory 32 has pre-selected music data recorded in a predetermined compressed form. In this mode of operation, the cellular phone 10 will has a slightly larger volume and weight than in the above-mentioned speech-only mode. However, the portability of the cellular phone 10 is rather superior to that of a cellular phone and an audio player separated from each other. The conversation function of the cellular phone 10 may be used as in the above case.

Battery pack 30 houses memory access circuit 36 as well as the battery body 35. Thus, memory 42 can be accessed by the data communication circuit 27 and the like, and the playback routine 24b, and data reading routine 24c of the DSP 24 can be executed. For using the audio player function of the cellular phone 10, the user operates keyboard 15 in a specified manner, selects desired music data while checking the guide instructions on the display 13, and designates to reproduce the selected music data.

Then, the music data is read from the memory 42 according to data reading routine 24c and supplied to DSP 24 via memory access circuit 36 and data communication circuit 27. The data is expanded and decoded according to the playback routine 24b, converted to a digital form which can be processed by the scale generation circuit 22, and further converted to an analog form by the scale generation circuit 22. Thereafter, the music data is heard as a reproduced sound from speaker 12. To listen to any other music data, the memory card 40 is removed, and another memory card having other music data stored therein is used as indicated above. In this way, music data can easily be reproduced for listening.

Finally, for the audio recorder function of the cellular phone (as shown in FIG. 3), the battery pack 30 is to be installed to phone body 14, memory card 40 is to be inserted in memory card slot 31 formed in the battery pack 30. Thus, the cellular phone 10 with the battery pack 30 is to be set in the battery recharger 50, and a data processor capable of transmitting music data in a predetermined compressed form, for example, the personal computer 60, is to be used.

An interconnecting cable 61 of the personal computer 60 is to be connected to the modular jack 51 of the battery recharger 50. Then, in the phone body 14, it is detected by the data communication circuit 27 when a serial communication with the personal computer 60 is possible, and the data transfer routine 24d of the DSP 24 is also enabled.

When music data is transmitted by operating the personal computer 60, the data is supplied to the DSP 24 via the cable 61, modular jack 51, contact terminals 52, contact terminals 32, contact terminals 18 and data communication circuit 27. The data is written to memory 42 via data communication circuit 27, other contact terminals 18, contact terminals 32, memory access circuit 36, contact terminals 34 and contact terminals 41 according to the data transfer routine 24d of DSP 24.

In this mode of operation, carrying of the cellular phone 10 is limited but music data can conveniently be recorded and edited while the battery body 35 in the battery pack 30 is being charged. There is no fear that the battery potential runs short during this operation.

As shown above, since the functions of the cellular phone 10 and battery recharger 50 according to the present invention can be selectively used due to a choice of combinations, the phone body 14, battery packs 3 and 30, battery recharger 50, cellular phone 10 and battery recharger 50 will come in handy to all users who prefer a compact and lightweight feature. Furthermore, complex and multiple functions, selective use of the conversation and audio playing and recording functions depending upon a time and place can be attained. To meet a demand for a longer playback of music data, battery body 35 in battery pack 30 may be increased in capacity, which however will add to the volume and weight of the battery pack 30. Even in this case, the user can freely select to use the larger capacity battery or the other.

Variant of the First Embodiment

Figure 4A:
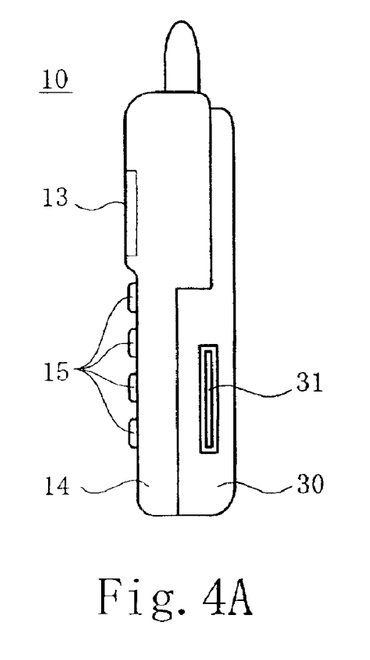
FIG. 4A is a right side elevation of a variant of the first embodiment of the cellular phone according to the invention.

FIG. 4A is a side elevation of a variant of the first embodiment of the cellular phone according to the present invention. As shown, cellular phone 10 includes the battery pack 30 designed to be nearly as long as phone body 14 in order to increase the capacity of the battery body 35. In this case, the thickness and weight of the cellular phone 10 are averaged along the length of the phone body 14, so this cellular phone 10 is easy to hold in hand and esthetically smart.

Another Variant of the First Embodiment

Figure 4B:
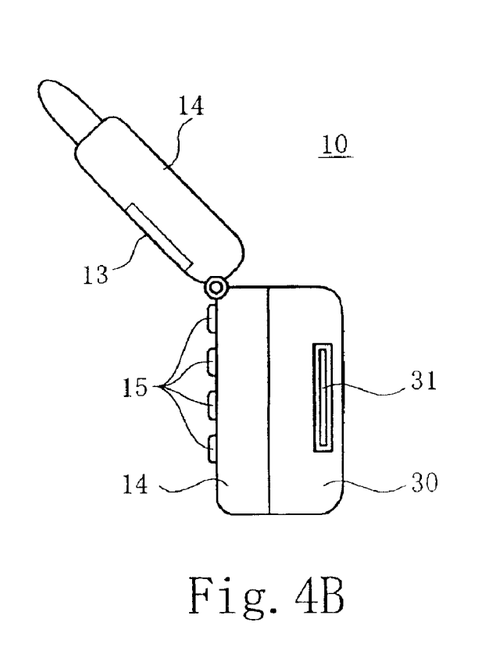
FIG. 4B is a right side elevation of another variant of the first embodiment of the cellular phone according to the invention.

FIG. 4B is a side elevation of another variant of the first embodiment of the cellular phone according to the present invention. The cellular phone 10 shown in FIG. 4B is of the type having a foldable phone body 14, to which the present invention is applied. The battery pack 30 is installed only to a lower one of the two split parts of the phone body 14. When in the folded state, the cellular phone 10 will be further compact.

Second Embodiment

Figure 5A:
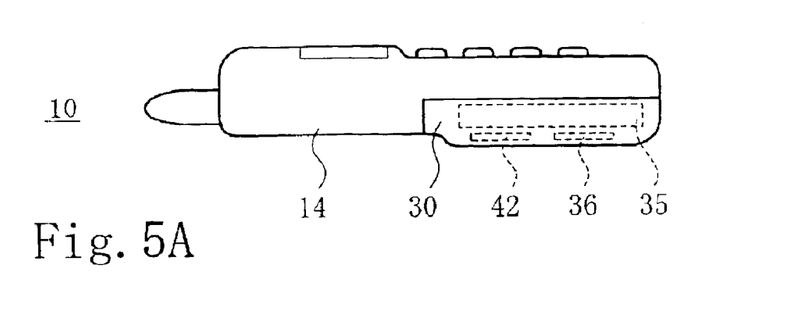
FIG. 5A is a side elevation of the cellular phone having a special battery unit installed.
Figure 5B:
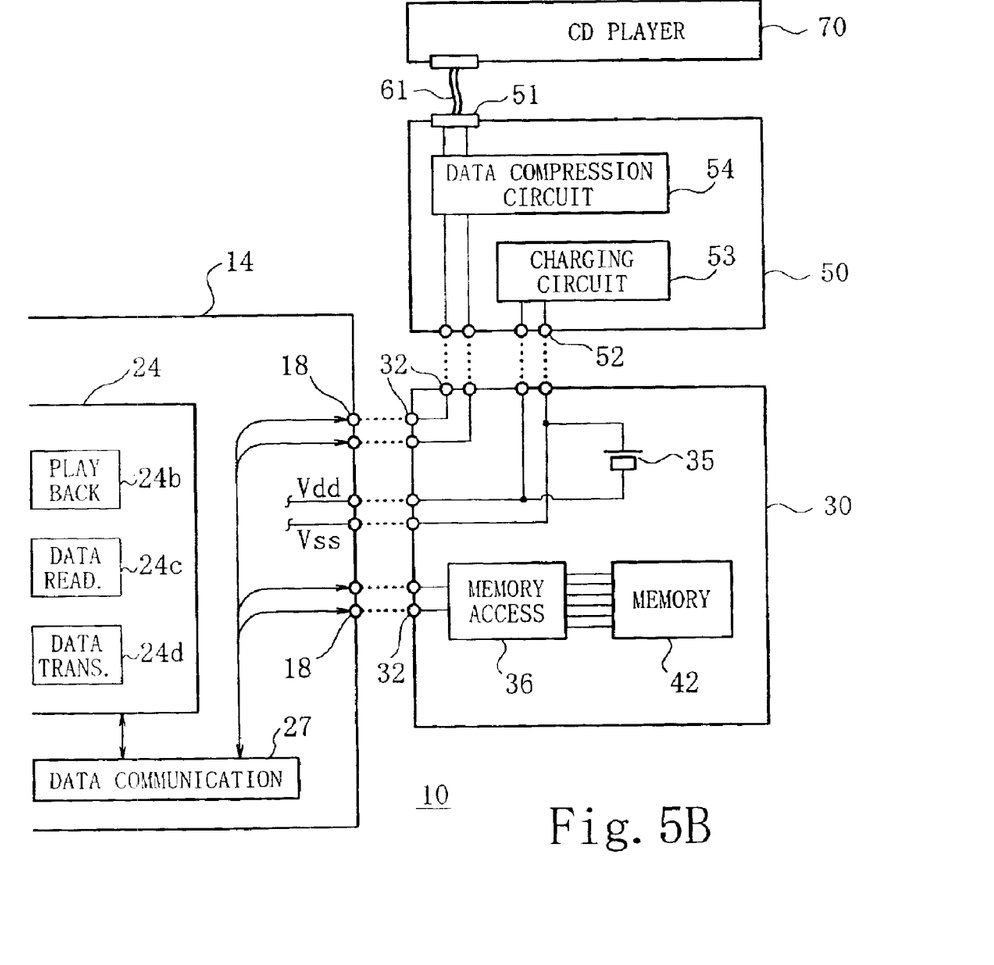
FIG. 5B is a block diagram of the cellular phone and special battery unit.

As shown in FIGS. 5A and 5B, cellular phone 10 and battery recharger 50 according to the second embodiment of the present invention differ from the first embodiment in that memory 42 is built in battery pack 30, and data compression circuit 54 (data conversion means) is additionally provided in battery recharger 50.

In this embodiment, since memory 42 is provided in the battery pack, and not in the memory card 40 as in the first embodiment, memory card slot 31 and contact terminals 34 and 41 are unnecessary to battery pack 30. Thus the battery pack 30 can be designed to be substantially the same or slightly larger in size as the battery pack 3. Further, the data can be changed by using personal computer 60 or the like via modular jack 51 of the battery recharger 50 although the memory card 40 cannot be replaced with another one as in the first embodiment.

Furthermore, data compression circuit 54 is provided between modular jack 51 and contact terminals 52, so that data is compressed in a form corresponding to the data expansion according to the playback routine 24b. Thus, by acquiring digital data to be compressed into battery recharger 50 via modular jack 51, and processing it in data compression circuit 54, it is possible to transfer and write a digital output from an ordinary audio player such as a CD player 70 to memory 42 as in the case where the personal computer 60 is used.

Third Embodiment

As shown in FIGS. 6A to 6D, cellular phone 10 and battery recharger 50 according to the third embodiment of the present invention are different from the first embodiment in that battery pack 30 is split into a battery adapter 80 provided with memory access circuit 36, memory card slot 31, and battery pack 3 incorporating battery body 35. This embodiment may be regarded as having battery adapter 80 additionally provided where the phone body 14 and battery pack 3 are to be installed (see FIG. 6A).

Figure 6A:
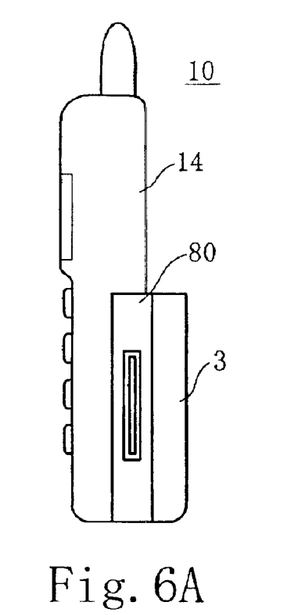
FIG. 6A is a right side elevation of the cellular phone having a battery adapter installed.
Figure 6B:
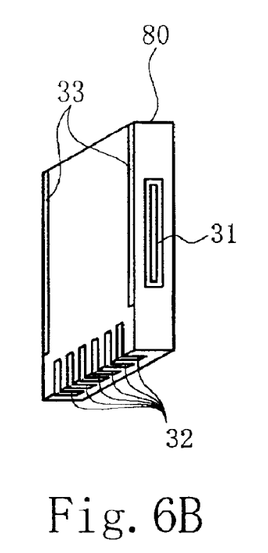
FIG. 6B is a perspective view of the battery adapter from the lower right.
Figure 6C:
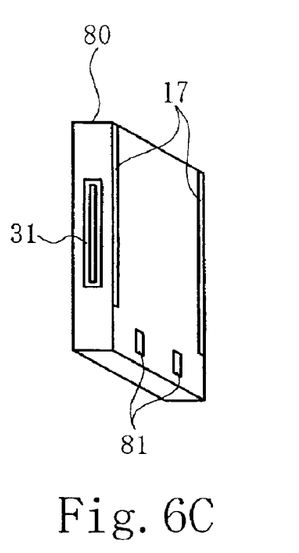
FIG. 6C is a perspective view of the battery adapter from the lower right.
Figure 6D:
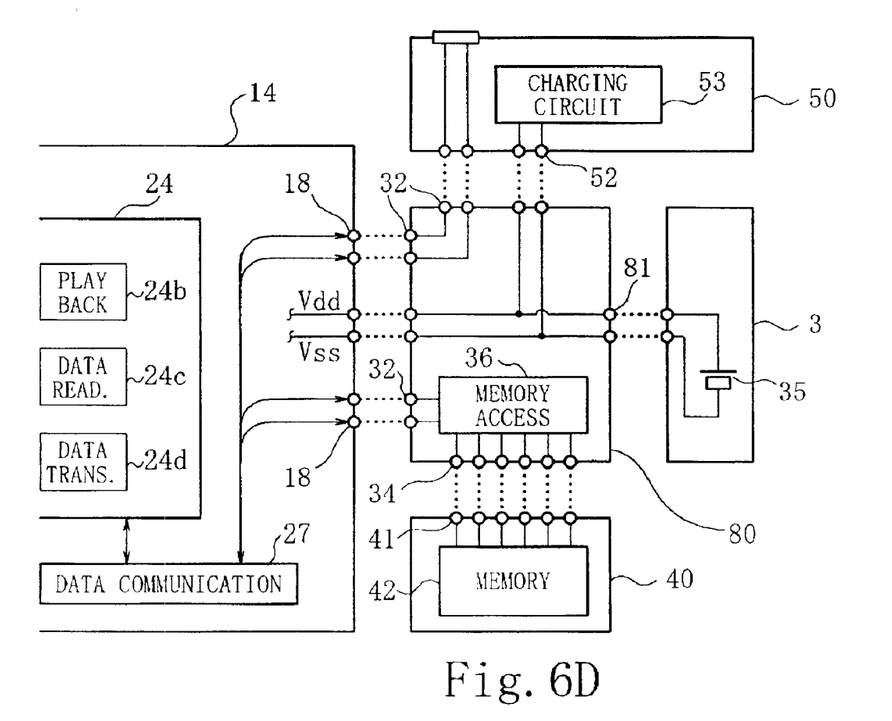
FIG. 6D is a block diagram of the cellular phone and battery adapter installed.

As shown in FIG. 6B, battery adapter 80 has the same surface for fixation to the phone body 14 and lower end face as those of the battery pack 30 of the first embodiment. The abutments 33 and contact terminals 32 are provided on the fixation surface and lower end face as shown in FIG. 6B. Similar to the battery fixing surface of the phone body 14, the side of the battery adapter 80 opposite to the fixation surface has provided thereon engagement guide 17 and only two contact terminals 81 corresponding to the contact terminals of the battery pack 3, as shown in FIG. 6C.

When the cellular phone 10 according to this embodiment is used only for the purpose of conversation, battery adapter 80 is to be removed and battery pack 3 is installed directly to phone body 14 as shown in FIG. 1C.

When the cellular phone 10 is used for audio playing (audio player and recorder), battery adapter 80 is to be first installed to a portion of the phone body 14 where the battery pack 3 is to be removably installed. Then battery pack 3 is to be installed to battery adapter 80 as shown in FIG. 6A. When the user wants to hear a music data or the like from the cellular phone 10, he or she is to insert the memory card 40 having that music data recorded therein into the memory card slot 31 in the battery adapter 80. The subsequent operations is same as in the above.

Also with the third embodiment, the user can have a choice of combinations of phone body 14, battery adapter 80 and battery pack 3 as above. Further, since only one battery pack of the standard type will do in this embodiment, it can be said that manufacturing costs and apparatus weight can be reduced relatively easily.

Fourth Embodiment

As shown in FIGS. 7A to 7D, cellular phone 10 and battery recharger 50 according to the fourth embodiment of the present invention differ from the first embodiment in that memory card 40 is provided between phone body 14 and battery pack 30 so as to be removably installable where the battery is to be installed.

Thus, memory access circuit 36 is provided in phone body 14, not in battery pack 30 as in the first embodiment, and contact terminals 34 are provided on the battery fixing surface of the phone body 14, not deep in the memory card slot 31 of the battery pack 30. Owing to this modification, not all the contact terminals 18 and 32 provided between the data communication circuit 27 and memory access circuit 36 are required, that is, only four contacts 18 and 32 are provided in total as shown.

Figure 7A:
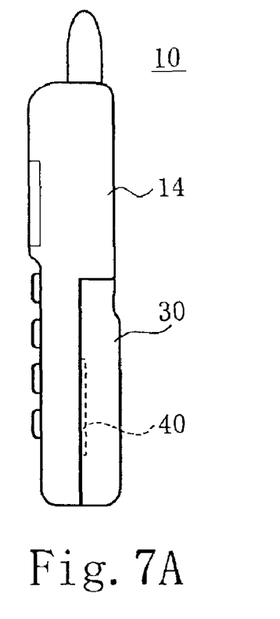
FIG. 7A is a right side elevation of the cellular phone having a special battery unit installed.
Figure 7B:
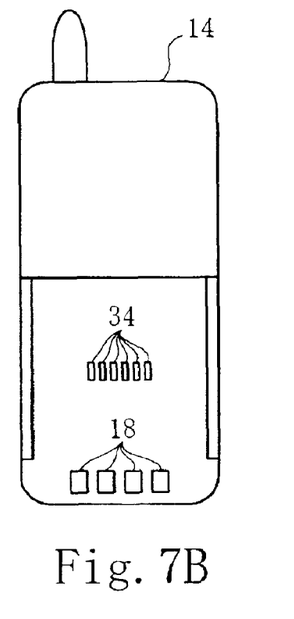
FIG. 7B is a rear view of the cellular phone body.
Figure 7C:
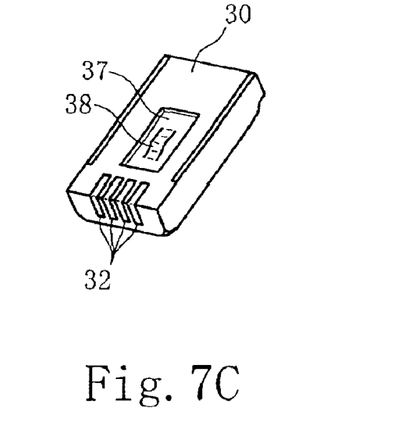
FIG. 7C is a perspective view of the special battery unit.
Figure 7D:
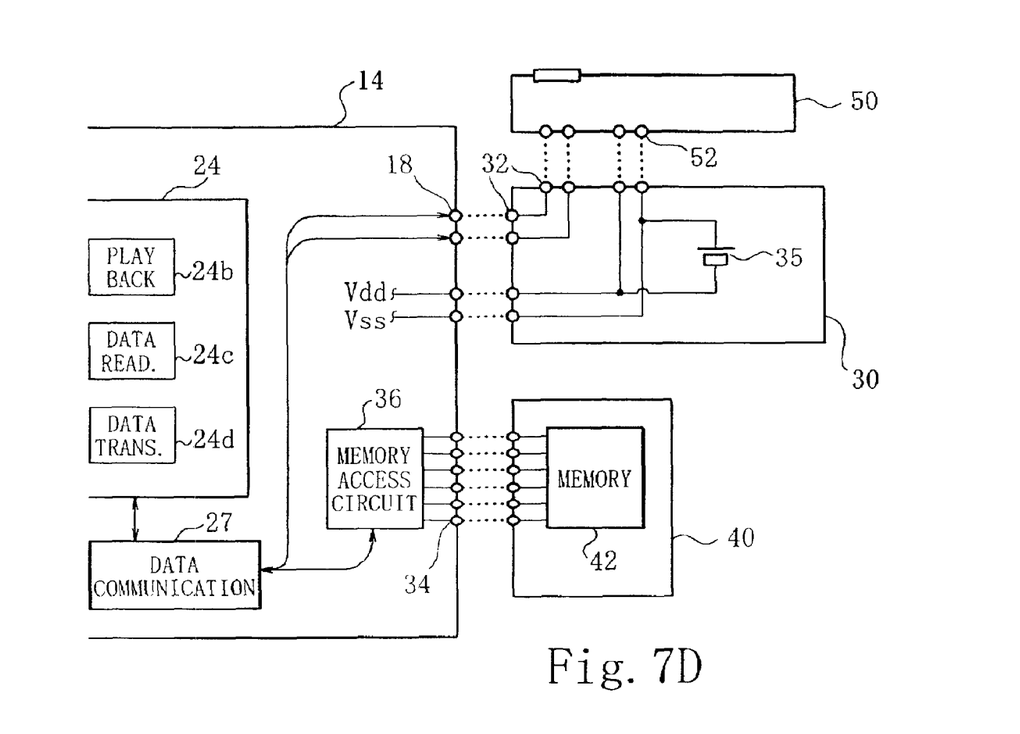
FIG. 7D is a block diagram of the cellular phone and special battery installed.

Furthermore, battery pack 30 has formed on the surface thereof a recess 37 large enough to receive the memory card 40. Also a spring 38 to force the memory card 40 towards phone body 14 for an electrical connection between the contact terminals 41 of the memory card 40 and the contact terminals 34 of the phone body 14 is provided on recess 37. Note that the spring 38 may be any other elastic member, for example, rubber.

When the cellular phone 10 according to the fourth embodiment is used only for conversation, the battery pack 3 or 30 may be installed to phone body 14. In this case, since battery pack 30 is designed to be slightly bulky correspondingly to recess 37, it will suffice to use only battery pack 30, not battery pack 3 along with it.

Similarly, for the purpose of audio playing or recording, battery pack 30 is to be installed to the phone body 14. Before this installation, memory card 40 should be attached to battery pack 30 by holding memory card 40 with contact terminals 41 at the front and upside and lightly pushing it into recess 37 of the battery pack 30 with care not to drop the memory card 40.

Also in this case, the user can have a choice of appropriate combinations of phone body 14, battery packs 3 and 30, and memory card 40. Further in this case, since the battery pack is slightly swollen as viewed from outside even when the battery pack 30 is used as described above, the cellular phone 10 will be sufficiently compact as an audio player.
Others Various embodiments of the cellular phone according to the present invention have been described. However, the present invention is not limited to such embodiments but can be applied to any other portable apparatuses such as PHS.

Also, the fixtures for installing the battery pack 3 (30) to the phone body 14 are not limited to engagement guides 17 and abutments 33 of the sliding type having previously been described, but they may be any other type such as a hooking member.

Further, the controlling and computing means for controlling the communication and conversation functions in phone body 14 are not limited to DSP 24 but may be a general-purpose microprocessor which can process data at sufficiently high speed, or a dedicated logic circuit which is sufficiently small due to a high circuit integration.

Also, data recorded in the memory 42 is not limited to music data but may be other data such as conversation data, and the compression form is not limited to MP3 but may be left uncompressed unless recording time is a problem.

In the aforementioned embodiments of the present invention, there are used six or four contact terminals 18 of phone body 14, six or four contact terminals 32 of the battery pack 30. However, the number of the contact terminals used is not limited to the above, but may be increased or decreased according to the communication protocols used in the data communication. Moreover, the communication data may be modulated or otherwise processed with an appropriate frequency discriminable from those of the source voltage and current, and the contact terminals 18 and 32 are used in common for both the data communication and energization to superpose data and power on each other or separate them from each other, whereby it is also possible to reduce the number of contact terminals used.

As having been described in the foregoing, based on the fact that the battery can be removably installed to the phone body of the cellular phone according to the invention, different types of batteries can be selectively used for an intended purpose, thereby permitting use of the data storage means while meeting the requirements for a compact and lightweight design of the cellular phone.

Also, in the cellular phone adapted to work as a player when the memory is installed therein, a player such as music player is integrally provided in the phone body while meeting the requirement imposed on the cellular phones for the compact and lightweight design.

Moreover, the battery recharger according to the present invention is adapted to send data to a memory even with no standard-compliant connectors built in the phone body, whereby the battery recharger can have a data storage means provided therein without any opposition to the compact and lightweight design requirement and thus it can suitably be used with the cellular phone.

What is claimed is:

1. A cellular phone comprising:

a phone body capable of wireless communication;

a battery removably installable so as to be contacted with the phone body via first contact terminals;

a memory provided between the phone body and the battery so as to be put into contact with the phone body via second contact terminals provided on a battery fixing surface of the phone body when the battery is installed to the phone body; and a memory access circuit provided in the phone body and permitting access to the memory from the phone body, wherein a recess large enough to receive the memory on the fixing surface of the battery is formed, and an elastic member is provided on the recess to force the memory towards the phone body.

2. The cellular phone as set forth in claim 1, further comprising a playback means for reproducing a sound based on data read from the memory.

* * * * *